United States Patent [19]

Bartholomew

[11] Patent Number: 4,859,194
[45] Date of Patent: Aug. 22, 1989

[54] SPARK PLUG CONNECTOR
[75] Inventor: Donald D. Bartholomew, Marine City, Mich.
[73] Assignee: Proprietary Technology, Inc., Southfield, Mich.
[21] Appl. No.: 178,273
[22] Filed: Apr. 6, 1988
[51] Int. Cl.⁴ .............................................. H01R 11/28
[52] U.S. Cl. ...................................... 439/125; 439/483
[58] Field of Search ......... 123/143 C, 169 P, 169 PA, 123/169 PH; 174/315, 775, 138 S; 313/135; 439/125–128, 476–484, 274–276, 589, 606, 736

[56] References Cited

U.S. PATENT DOCUMENTS

| | | |
|---|---|---|
| 1,489,162 | 4/1924 | Skelton et al. . |
| 2,379,942 | 7/1945 | Webber . |
| 2,458,121 | 1/1949 | Waldron . |
| 2,651,298 | 9/1953 | Brinson et al. . |
| 3,597,723 | 8/1971 | Schmidt et al. . |
| 3,656,084 | 4/1972 | Malia . |
| 3,803,529 | 4/1974 | Rohrig et al. . |
| 3,871,737 | 3/1975 | Dorrell et al. . |
| 3,914,003 | 10/1975 | Loy . |
| 3,965,879 | 6/1976 | Fitzner . |
| 4,082,980 | 4/1978 | Yoshikawa et al. . |
| 4,351,309 | 9/1982 | Schleupen et al. . |
| 4,443,047 | 4/1984 | Hofmann . |

FOREIGN PATENT DOCUMENTS 2730084 1/1979 Fed. Rep. of Germany .
3426783 1/1986 Fed. Rep. of Germany .

*Primary Examiner*—Gary F. Paumen
*Attorney, Agent, or Firm*—Harness, Dickey & Pierce

[57] ABSTRACT

A spark plug connector comprises an elbow-shaped contact pre-molded with a first elastomeric material and placed into a dielectric housing which is injection molded with a second elastomeric material to form a subassembly which is releasably locked to a rigid sleeve having a U-shaped handle to insert or remove the assembly. The sleeve is rotated to drive its interior cam teeth into engagement with or disengagement from an annular groove on the housing exterior. The second elastomer forms shoulders which interlock with the housing and seals about the conductor and the contact portions to prevent moisture attack and resist forces that could disrupt the termination.

23 Claims, 2 Drawing Sheets

U.S. Patent   Aug. 22, 1989   Sheet 1 of 2   4,859,194
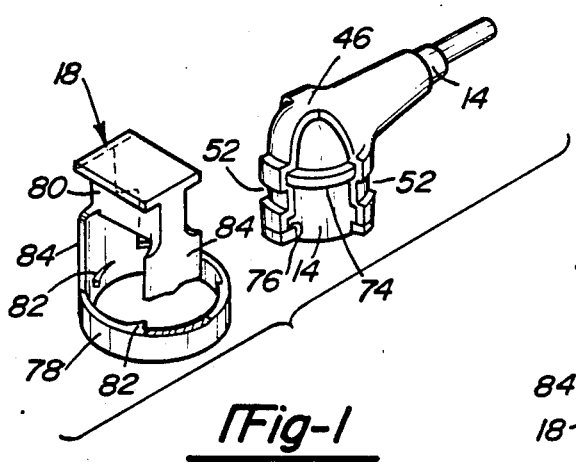
Fig-1
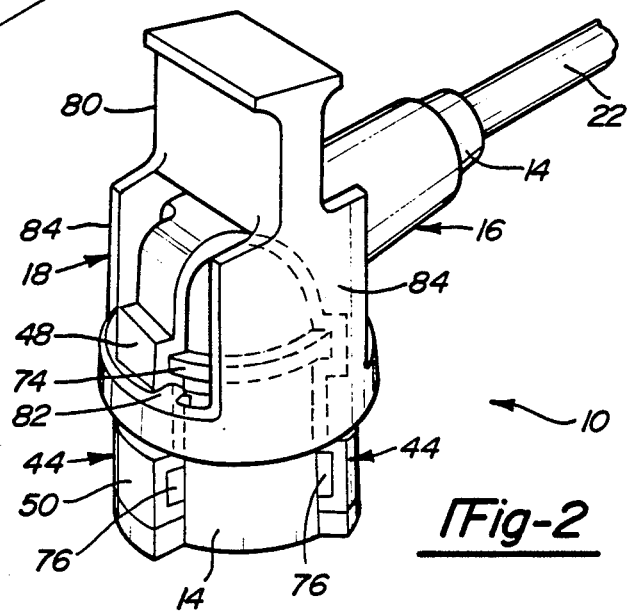
Fig-2
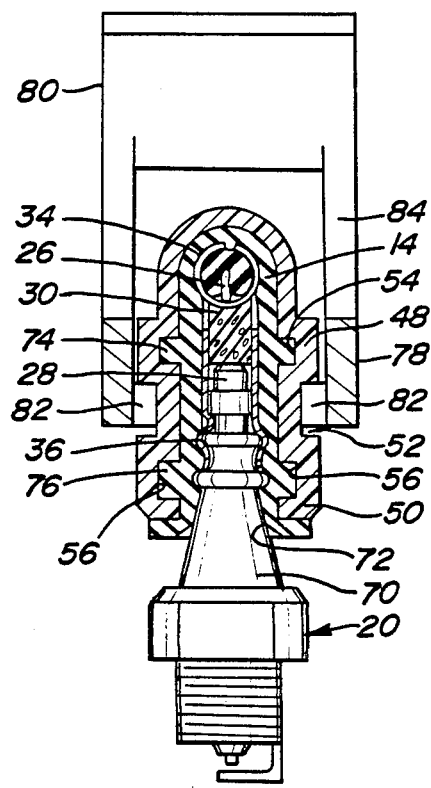
Fig-5
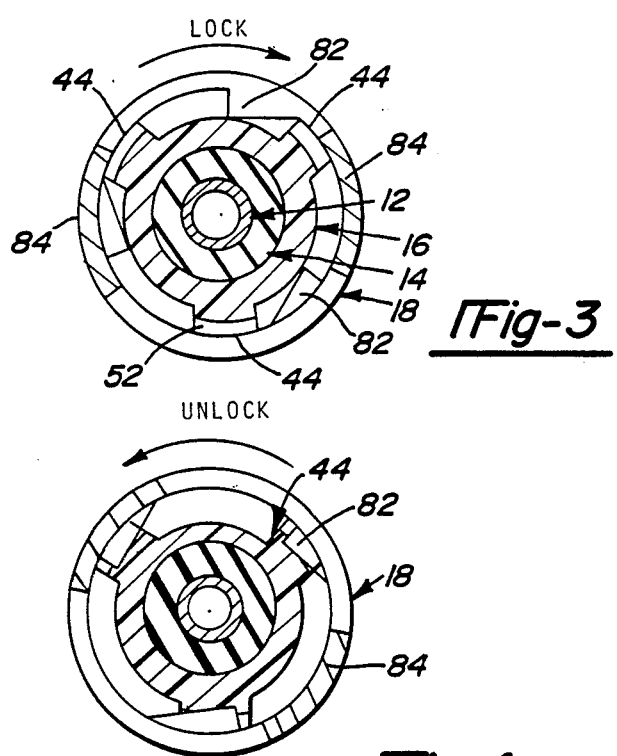
Fig-3
Fig-4

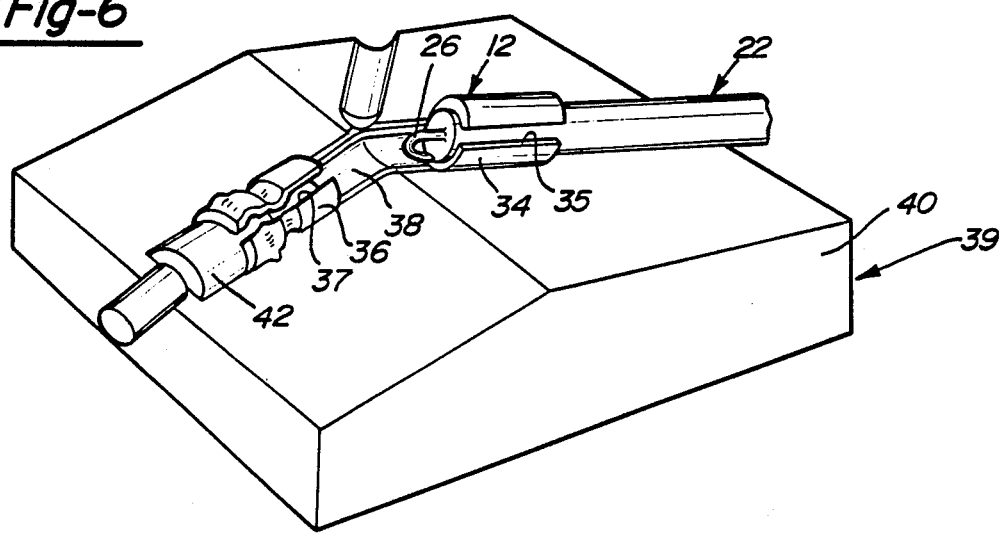
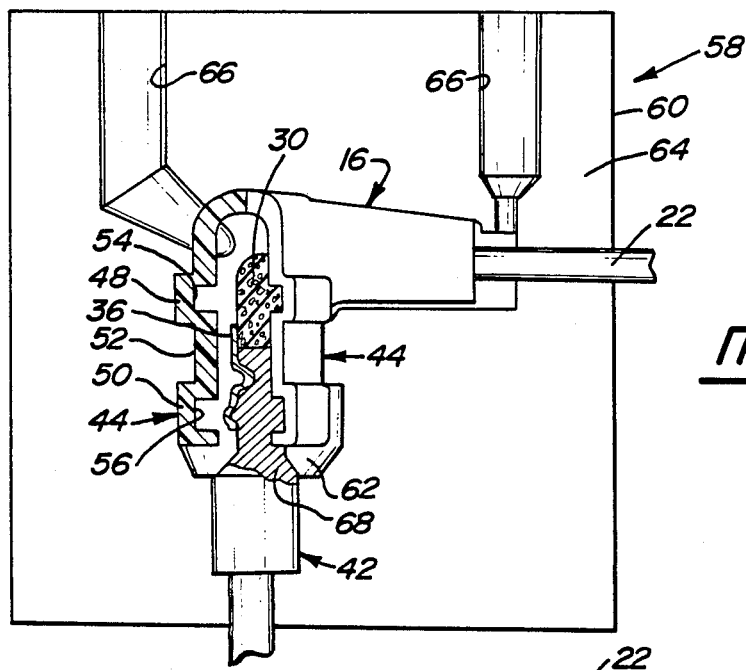
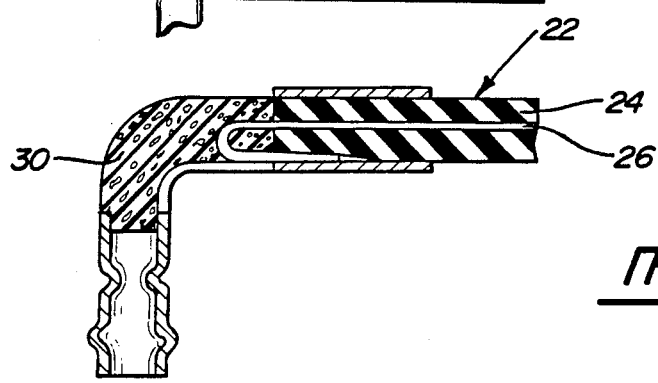

SPARK PLUG CONNECTOR

BACKGROUND AND SUMMARY OF THE INVENTION

This invention relates to a spark plug connector for connecting an ignition wire to a spark plug electrode in an internal combustion engine.

An ignition connector for interconnecting a pulse signal to an igniting means (e.g. a spark plug) of an internal combustion engine typically includes a conductive contact having a conductor receiving portion and a spark plug electrode receiving portion. An elastomeric boot can be utilized to enclose a wire end when terminated to the conductor receiving portion of the contact whereby to moisture seal the termination. In present boot assemblies, a user grasps either the wire or the boot to apply the requisite insertion or withdrawal force. Oftentimes the boot has inadequate material for resisting pull forces placed on the boot during its removal from the spark plug. Disadvantageously, this installation could possibly disrupt the termination or deform the contact thereby reducing electrical contact and/or mechanical retention with the electrode.

Insert molding of the boot to the terminated contact is desirable because it is inexpensive and can assist in relieving problems that occur unless the termination is completely sealed, in which case contaminants can enter the terminated area leading to spark erosion of the termination thereby reducing electrical efficiency. Arcing between the wire conductor and contact can erode to the point where the proper functioning of the interconnection will cease altogether.

To overcome these deficiencies, a desirable spark plug connector would have elastomeric material insert molded into and about the contact in such a manner that the termination between the wire center conductor and the contact is protectively embedded in a first body of elastomer and the contact is embedded in the housing in a second body of elastomer, thereby providing an arrangement wherein the installation forces a force engage the elastomer in such a manner that they do not adversely affect the termination.

In accordance with this invention, a spark plug connector for an internal combustion engine includes a rigid dielectric housing, a boot comprised of a first elastomeric material which fills the housing, a metal contact embedded in the elastomeric material having a pair of conductor receiving portions one electrically terminated to the center conductor of a wire and the other configured to connect to the electrode of the spark plug, and a rigid lock sleeve connected to the boot. The housing and the boot include coacting interlocking shoulder portions for transferring forces applied to the housing to the boot when the connector is removed or fitted to the plug. By this arrangement, installation and removal forces applied to the housing do not disturb the relationship between the center conductor of the wire, the contact and boot.

In a preferred embodiment a second elastomeric material, either electrically conductive or nonconductive, is pre-molded about the wire and its center conductor and between the receiving portions when the contact is in a first mold. Thereafter the pre-molded wire assembly and housing are placed in a second mold and the first elastomeric material is insert molded directly into the housing and about the contact to form the boot, the second elastomeric material being used to assure that injection of the first elastomeric material into the housing does not damage the center conductor.

The lock sleeve has a ring portion sized to fit the boot assembly, a serrated tooth from the ring for engaging a groove in the housing to lock to the housing, and a handle to assist in assembly and disassembly with the spark plug whereby to obviate the user grasping the wire or boot. The lock sleeve engages the housing in a manner to compress the housing radially inward with the associated forces on the housing acting to augment engagement of the boot and/or contact to the spark plug.

By insert molding, the elastomeric boot more closely follows the surface contours of the wire and the contact to inhibit contamination, moisture, etc. from attacking the mechanical and electrical interface, so that spark erosion does not occur. Using the handle as a rigid guide reinforces the elastomeric boot to minimize eccentric movements of the contact during mating which may reduce its electrical and/or mechanical efficiency, and inhibit relative movement between the contact, wire and boot that might act to disturb the intimate relationship therebetween.

The foregoing and other advantages will become more apparent when viewed in light of the accompanying drawings and following detailed description wherein:

BRIEF DESCRIPTION OF THE DRAWINGS

FIG. 1 is an exploded perspective of a boot assembly positioned for assembly to a rigid lock sleeve;

FIG. 2 shows the boot assembly received within the lock sleeve;

FIGS. 3 and 4 are elevation views, partially in section, of the boot assembly unlocked and locked within the lock sleeve;

FIG. 5 is a cross-section of the assembly shown in FIG. 2;

FIG. 6 shows a wire terminal molding step;

FIG. 7 shows a wire termination resulting from the molding step of FIG. 7; and

FIG. 8 shows a molding step to produce the boot assembly.

DETAILED DESCRIPTION OF THE PREFERRED EMBODIMENT

Turning now to the drawings, FIGS. 1-5 show a moisture sealed spark plug connector 10, useful in an engine ignition system (not shown), that includes a metal contact 12 embedded in a body od elastomeric material 14 formed into a boot, a generally rigid cylindrical housing 16 of dielectric material, and a lock sleeve 18 for use in mounting and/or demounting the assembly to the spark plug 20, the contact 12 for transferring current between the center conductor 26 of an insulated wire 22 terminated thereto and the electrode of the spark plug 28. In accordance with this invention, a first elastomer 14 is directly insert molded to the contact and its termination to the center conductor to inhibit arcing, protect the conductor and seal the termination, and a second elastomer 30 is directly insert molded into the housing and about the pre-molded contact when placed within the housing, the resulting elastomeric boot assembly 32 thus formed then being snap-fitted into the lock sleeve. The spark plug connector is connected to the electrode by movements generally upward and/or downward but along the axis of the electrode. In particular, second elastomer 30 may be conductive or nonconductive. The elastomers 14 and 30 could comprise a dense spongy-like material such as a neoprene rubber.

As shown best in FIGS. 6-7, contact 12 includes a conductor receiving portion 34, a spark plug electrode receiving portion 36, and an intermediate portion 38 that forms a 90° transition between the portions whereby to define an elbow, each receiving portion, respectively, being formed when its wall portion is deformed into a generally cylindrical cross-section. Elastomeric material 30 is provided between the receiving portions 34 and 36 of the contact prior to insert molding of the contact in the housing 18 to assure that the center conductor 26 is not damaged.

The wire 22 has an end portion of its outer insulative jacket 24 removed to expose a portion of its center conductor 26 which is then folded rearwardly and against the jacket and this wire end portion then inserted into conductor receiving portion 34 in such manner that the center conductor makes intimate contact therewith. The wall portion forming the conductor receiving portion is crimped, in and by the molding apparatus, about the wire portion to terminate and secure the wire portion to the contact.

A mold assembly 39 having complementary top and bottom mold members 40 (the top mold not being shown) are brought into confronting relation to define a closed cavity for receiving elastomeric material 30, the contact 12 and an end portion of the wire. For molding, a core pin 42 is fitted into the spark plug electrode receiving portion 36 and the wire having its exposed conductor fitted into the conductor receiving portion 34 and then fitted into the cavity. Confronting movement of the mold members deforms the wall portion of each conductor receiving portion such that respective edges 35 and 37 thereof come into close adjoining relationship and form generally cylindrical portions. Thereafter, elastomeric material 30 is injected into mold assembly 38 thereby forming a body of material between the conductor receiving portions.

The cylindrical housing 16 is comprised of a rigid dielectric material capable of withstanding high temperatures suitable for use in an insert molding process and also durable enough to shoulder loads during mating insertion/removal of the connector. The housing includes three leg members 44 and a head portion 46, the leg members being interconnected to the head portion at one of their ends and free at their other ends. Each leg includes a pair of annular ribs 48 and 50 and an outwardly opening annular groove 52 therebetween which defines a cam or tooth engagement surface and assists in molding, and a pair of inwardly opening annular grooves 54 and 56 one in each rib which form the coacting interlocking shoulder portions between boot 14 and housing 16. The three legs are generally equiangularly spaced relative to the head portion and define axial separations sized to pass a cam tooth from the lock sleeve into register with outwardly opening annular groove.

A mold assembly 58 includes complementary top and bottom mold members 60 (the top mold member not being shown) each having a cavity portion 62 formed in its confrontable face 64, a complete cavity sized to receive the cylindrical housing 16 and the pre-molded wire assembly formed above being formed when the members are brought together. The space in the mold cavity not occupied by the housing or wire assembly defines the boot 14 (See FIG. 8). A gating system (not shown) communicates runners 66 to the cavity to provide a flow pattern into the mold that minimizes forces to the parts by the in-rushing mold material, and maximizes uniformity of flow. A timing valve (not shown) assures the proper amount of elastomer is injected into the mold. The core pin 42 positions the wire assembly with contact in the cavity and includes an enlarged portion 68 for forming an enlarged rearward chamber in boot 14 for gripping about the forward end portion 70 of the spark plug. Ejectors (not shown) would assist in removal of the molded assembly.

Elastomeric material 14 is injected into the mold cavity 62 so as to completely fill the interior of the housing and embed the wire assembly into the boot formed by material 14, the elastomer filling annular grooves 54 and 56 and surrounding contact 22, including elastomeric material 30 formed between the contact receiving portions. The boot, when formed, includes an opening 72 leading to the enlarged chamber sized to receive the spark plug. Advantageously, the boot portion forming the chamber helps to moisture seal the connection to the spark plug and grip the forward end of the plug. Advantageously, annular shoulders 74 and 76 formed by annular grooves 54 and 56 interlock with the housing (one being received in each annular groove) to distribute loads otherwise transmitted to the contact and the termination to the electrode or conductor.

Lock sleeve 18 is comprised of a rigid material, such as a rigid plastic, and includes a cylindrical ring 78 and a U-shaped bail or handle 80 for applying both torque (rotation) as well as axial forces to the connector during assembly/disassembly. Cylindrical ring 78 has an inner wall sized to receive boot assembly 32 and cam members 82 (or teeth) for fitting between adjacent legs 44 and bitingly engaging the respective cams 52 when the handle is rotated. The handle includes a pair of generally like-shaped arcuate handle portions 84 to provide a cross-section that inhibits warping or deflection during rotation or axial motion.

The cam members or lock teeth 82 that bite into housing 16 may be slightly serrated and of different radial extensions from the ring so that ceramic diameter variations between different spark plugs may be accommodated. Serrated teeth would also allow further rotational tightening at a future time when some cold flow had taken place in the parts that would tend to relax the compressional forces on the spark plug. These serrations would provide a lock near any point that the locking twist was terminated because of diameter size differences.

FIG. 1 shows a boot subassembly 32 comprising the rigid housing 16 and the elastomeric body 14 including the contact 12, positioned for interlocking engagement with lock sleeve 18. One handle portion 84 is partially removed to show detail of the ring 82 and teeth 82 on the ring portion. The boot subassembly is angled downwardly and inwardly of the "U" of the handle such that the slots between adjacent legs register with the cam teeth, squeezed into the ring portion of the lock sleeve, and then forced downwardly such that the cam teeth register with the annular groove. FIG. 3 shows this insertion. The lock sleeve is then rotated relative to boot subassembly 32 such that the cam teeth will engage the annular grooves on the respective legs, such final lock position being shown in FIG. 4.

When the handle is rotated the lock sleeve compresses or releases the legs which act to compress or release the boot which enhances locking, or release of the boot or contact to the spark plug. The handle portion may thus be used to mount or dismount the connector to or from the spark plug without damage to the wire or contact. The handle may lock or unlock the connector to the spark plug and inhibits undesirable deformations of the connector which might act to damage the termination between the wire and contact.

Forces applied to the handle portions are transmitted to the housing and then to the boot, the housing providing a columnar stiffening to the boot. Because there is a tendency for the elastomeric material of the boot to become bonded to the ceramic insulator of the spark plug considerable forces may be required to break this bond, oftentimes resulting in mechanical damage to the termination. Advantageously in the invention described herein the housing applies forces to the boot in the interlocked area which readily breaks this bond without mechanical damage to the connection.

Pre-molding the contact prior to the insert molding of the boot protects the center conductor from damage by the boot elastomeric material which would have a higher viscosity and thus apply much greater forces to the center conductor. The pre-mold elastomeric material, which can much better encapsulate the center conductor, provides better resistance to arcing between the core and terminal if the material is nonconductive, and better conductive path to the contact if the material is conductive. FIGS. 5, 7 and 8 show a conductive elastomeric material being utilized. Depending on the configuration of a specific contact the pre-potting elastomer can be used to seal areas of the contact that might be difficult or expensive to seal off some other fashion. Sealing contact areas may be necessary to ensure that the elastomer forming the boot does not intrude in the contact area that makes the contact to the spark plug.

The locking feature wherein the handle-sleeve compresses the fingers of the housing and boot material radially inwardly against the spark plug as a result of the ring portion being rotated relative to the housing and boot and stiffening by the housing makes possible the use of contacts which depend in some degree on an externally applied clamping to complete their connection. Contacts which rely on its own spring characteristics may contact the electrode only in two or three points and all of the current must pass through these two or three points, if arcing between the terminal and plug is to be avoided. The current density depends upon how many contact points share the transfer point of the current into the spark plug terminal, and reducing the current density at each of these points increases the functional life of the connection; reduces the possibility of an arc which will cause damage to the connection; and reduces unwanted electromagnetic energy which can adversely effect adjacent electronic systems. Contact designs which employ lengthwise fingers (roughly parallel to the axis of the contact and spark plug) are workable because of this connector. Since each of these fingers can contact at one or more points of the spark plug terminal. The terminal no longer must provide the mechanical structure for support or alignment in securing the connector the spark plug.

While the above description constitutes the preferred embodiments of the present invention, it will be appreciated that the invention is susceptible to modification, variation and change without departing from the proper scope and fair meaning of the subjoined claims.

What I claim is:

1. A spark plug connector comprising a boot assembly, and a rigid lock sleeve connected to the boot assembly, said boot assembly including a contact having a pair of conductor receiving portions integral with one another and disposed within a body of elastomeric material, said portions being separated from one another by a space, one and the other said portion being adapted to terminate to a spark plug electrode and to the center conductor of a wire extending from the body, respectively, and dielectric means extending between said portions and filing said space for inhibiting arcing between the electrode and center conductor, said lock sleeve including means for transmitting forces to the body in a direction substantially aligned with the axis of the electrode.

2. The spark plug connector as recited in claim 1 wherein said boot assembly includes a rigid housing of dielectric material and said body is insert molded relative to said housing and about the contact when disposed in said housing.

3. A spark plug connector comprising a housing formed of a dielectric material, a contact disposed in said housing, an elastomeric boot assembly insert molded directly into the housing whereby to embed the contact in said elastomer, and a rigid lock sleeve demountably engaged to said housing, said lock sleeve being engaged with said housing and including means for transmitting rotational and axial forces relative to said electrode.

4. A spark plug connector comprising a contact having a pair of conductor receiving portions, one said portion being connectable to a spark plug electrode and the other said portion being terminated to a center conductor of a wire, a body of a first elastomeric material being molded to the contact and between the portions thereby sealing the center conductor, a body of a second elastomeric material insert molded directly into said housing about the contact portions after the first elastomeric material has been molded about the contact, a rigid housing, and a rigid lock sleeve having a handle extending therefrom for engaging the housing and transmitting forces to the second elastomeric material.

5. A moisture sealed connector for connection to a spark plug comprising a metal contact having a conductor receiving portion and an electrode receiving portion, a conductor extending from a jacket of insulating material and into electrical contact with said conductor receiving portion, and a first body comprised of a first elastomeric material disposed around said contact and a portion of said jacket, characterized by a second body comprised of a relatively rigid dielectric material partially enclosing said first body,
locking means for interlocking the bodies together, and extending between the receiving portions for preventing arcing and moisture sealing the electrical connection between the conductor and the contact.

6. The connector as recited in claim 5 wherein said locking means comprises an inwardly opening annular groove on said second body for receiving said first elastomeric material during molding of said first body whereby to form an integral radially outwardly extending annular shoulder on said first body, the shoulder interlocking with the groove and acting to distribute axial forces that would otherwise be directed at the electrical connection.

7. The connector as recited in claim 5 wherein said first body includes an annular chamber adapted to receive and engage about a forward end portion of the spark plug when its electrode is received in the electrode receiving portion.

8. The connector as recited in claim 5 wherein said second body is a generally cylindrical housing including a pair of legs each having an exterior annular groove, each leg extending axially and adjacent legs being separated by an axial slot, further characterized by a rigid lock sleeve comprising a ring which encircles said second body, a handle to push-on/pull-off the connector from the spark plug, and a cam tooth adapted to pass through one said slot and be rotated into biting engagement with the annular groove to releasably lock the sleeve to the housing.

9. The connector as recited in claim 5 wherein said second elastomeric material has a lower density that said first elastomeric material 10. The connector as recited in claim 5 wherein said second elastomeric material is conductive.

11. The connector as recited in claim 5 wherein said second elastomeric material is nonconductive.

12. The connector as set forth in claim 8 which includes means for interlocking said lock sleeve and said elastomeric material.

13. The connector as recited in claim 8 wherein said housing includes three said axial slots and three said legs and said lock sleeve includes three said cam teeth, said cam teeth and said slots being equiangularly spaced such that one of said cams is received in each respective slot and rotation of the sleeve causes each said cam tooth to bite into one respective said annular groove in the housing.

14. The connector as recited in claim 5 wherein said center conductor extends from the wire and into contact with said conductor receiving portions one end of said conductor receiving portion being adjacent the conductor and provided with said second elastomer.

15. The connector as recited in claim 14 wherein said contact includes a transition portion which connects the receiving portions so that each is spaced from the other and has its axis disposed at an angle to the axis of the other, and said second elastomer engages the transition portion.

16. The connector as recited in claim 8 wherein said cam is disposed in a plane generally perpendicular to the axis passing through said electrode receiving portion.

17. The connector as recited in claim 15 wherein said transition portion is nontubular in cross-section.

18. In a spark plug connector for use in an engine ignition system, the combination of an elbow-shaped electrical contact having a conductor receiving portion and an electrode receiving portion, and a boot of a first elastomeric material integrally molded about the contact, characterized in that a second elastomeric material is molded to said conductor receiving portion of the contact and in sealing relation to the conductor, said second elastomeric material being molded prior to the first elastomeric material, and interlocking support means for supporting the boot and forcing the contact into electrical connection with an electrode of the spark plug, said interlocking means including a rigid lock sleeve removably connected to the boot and having a support handle to assist in push on and pull off movement of the boot.

19. The connector as recited in claim 18 wherein said interlocking sleeve means further comprises a rigid cylindrical housing, said housing having an outwardly opening annular groove and forming a space within which said contact is received, said boot being integrally molded into said housing to embed said contact therewithin and form an annular shoulder in said groove.

20. The connector as recited in claim 19 wherein said lock sleeve includes an inward annular cam and adapted to rotate relative to said cylindrical housing whereby said cam engages with the periphery of said groove to lock the two together or contrariwise rotation causes disengagement from the channel and allows the sleeve to axially disengage from the housing.

21. The connector as recited in claim 18 wherein said boot has a mating end portion extending forwardly of the electrode receiving portion and defining an enlarged annular chamber to receive and grip about the mating end portion of the spark plug when the electrode receiving portion receives the electrode.

22. In an ignition system a connection device for transferring current between the electrode of a spark plug and a conductor of an insulated wire, said connection device including a contact integrally molded into a body of spongy insulative material and having one end portion terminated to said conductor and another end portion spaced from an integral with said one end portion and connectable to said electrode, said end portions being separated by a space, further characterized by a relatively rigid housing including on its inner wall an annular groove filled by said insulative material, said insulative material filling said groove during the molding of the body whereby to form interlocking shoulders which prevent relative motion between the housing and the contact and filling the space between the end portions of said contact whereby to moisture seal the termination.

23. The connection device as recited in claim 22 further characterized by a frame removably locked to the housing whereby for an axially directed force on the frame forces are transferred to the housing to bear loads which could disturb the contact and cause the boot to relinquish the spark plug.

* * * * *